United States Patent [19]

Baldwin et al.

[11] Patent Number: 5,092,651
[45] Date of Patent: Mar. 3, 1992

[54] SLIDING AND TILTING SUNROOF CONTROL MECHANISM

[75] Inventors: David P. Baldwin, Romeo, Mich.; Jean M. Denat, Boblingen, Fed. Rep. of Germany; Jose A. Mirkin, West Bloomfield, Mich.

[73] Assignee: General Motors Corporation, Detroit, Mich.

[21] Appl. No.: 562,085

[22] Filed: Aug. 3, 1990

[51] Int. Cl.⁵ ............................................. B60J 7/05
[52] U.S. Cl. ................................... 296/223; 296/221
[58] Field of Search ...................... 296/216, 221-224

[56] References Cited

U.S. PATENT DOCUMENTS

| | | | |
|---|---|---|---|
| 4,537,442 | 8/1985 | Jardin | 296/221 |
| 4,596,419 | 6/1986 | Masuda | 296/221 |
| 4,601,512 | 7/1986 | Boots | 296/221 |
| 4,632,449 | 12/1986 | Masuda | 296/222 |
| 4,643,478 | 2/1987 | Boots | 296/224 X |
| 4,679,846 | 7/1987 | Lux et al. | 296/223 X |
| 4,699,421 | 10/1987 | Schaetzler et al. | 296/223 X |

*Primary Examiner*—Dennis H. Pedder
*Attorney, Agent, or Firm*—Charles E. Leahy

[57] ABSTRACT

A control assembly moves a sunroof panel between a rearwardly upwardly tilted venting position, a closed position flush with the vehicle roof and a rearwardly downwardly tilted collapsed position from which the sunroof is retracted into a recess in the vehicle roof. The control assembly includes a carriage constrained within guide tracks and having a lift cam surface and a collapse cam surface. An actuator arm is pivoted to the sunroof panel and captured by the carriage and includes a lift cam follower which cooperates with the lift cam surface to move the sunroof panel toward the venting position, and a collapse cam follower cooperating with the collapse cam surface to move the sunroof panel toward the collapsed position. A brace member extends between the carriage and the actuator arm for assisting movement of the sunroof panel between the collapsed position and the venting position.

2 Claims, 4 Drawing Sheets

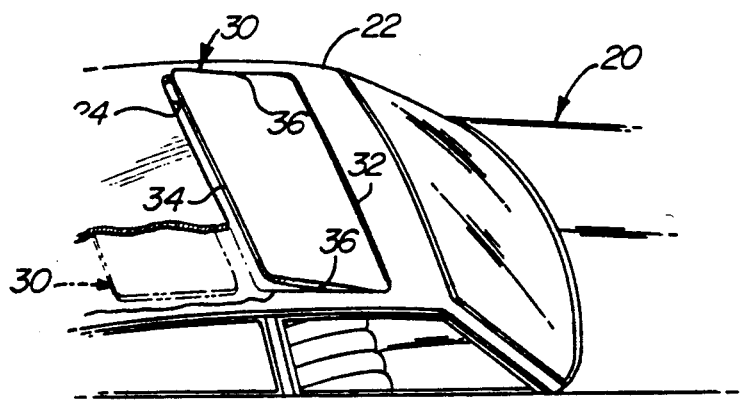
FIG. 1
FIG. 2
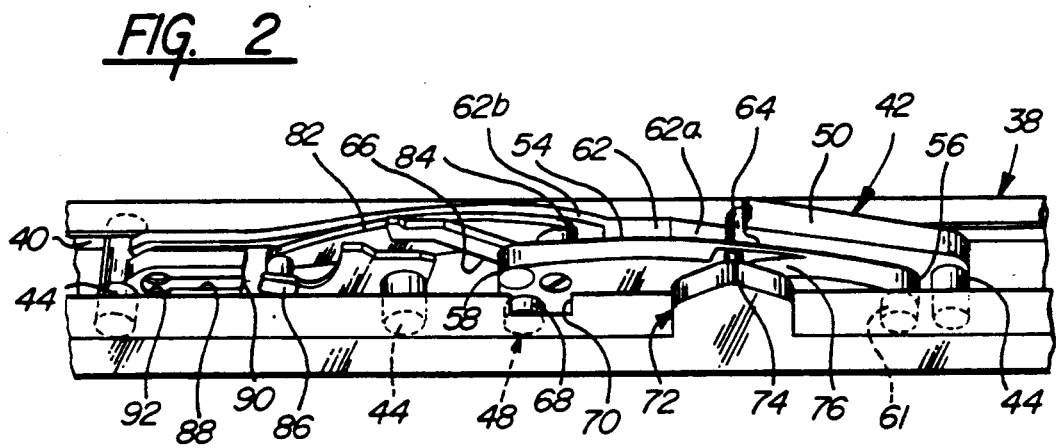
FIG. 3
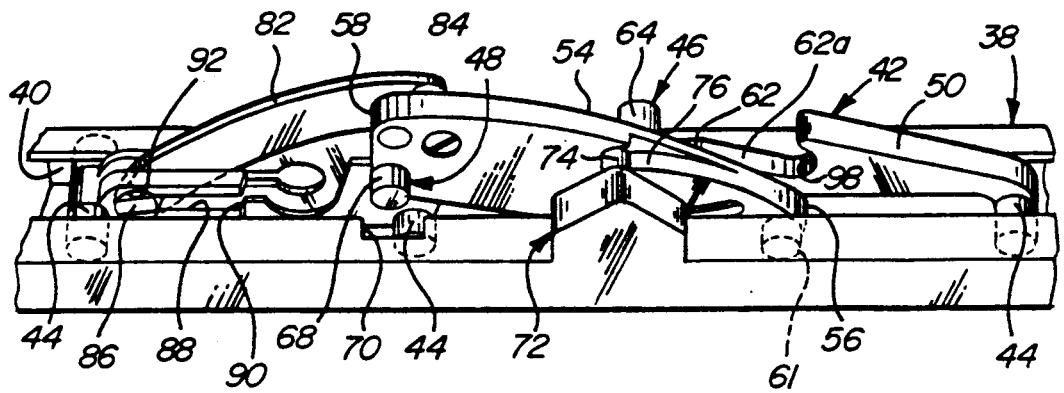

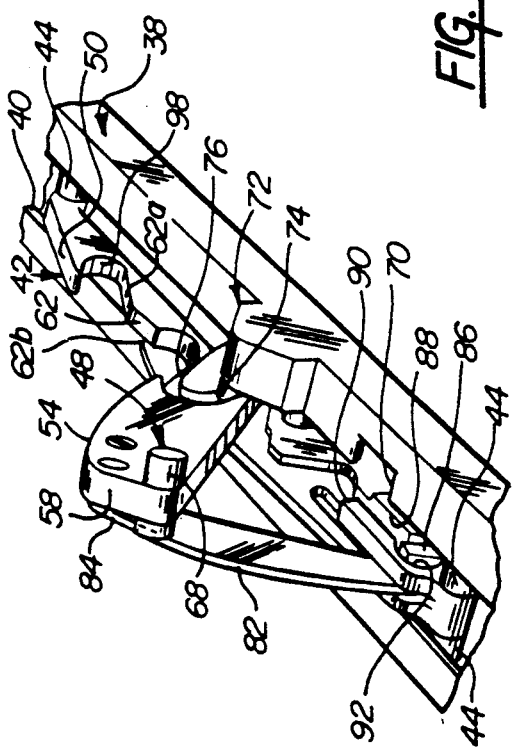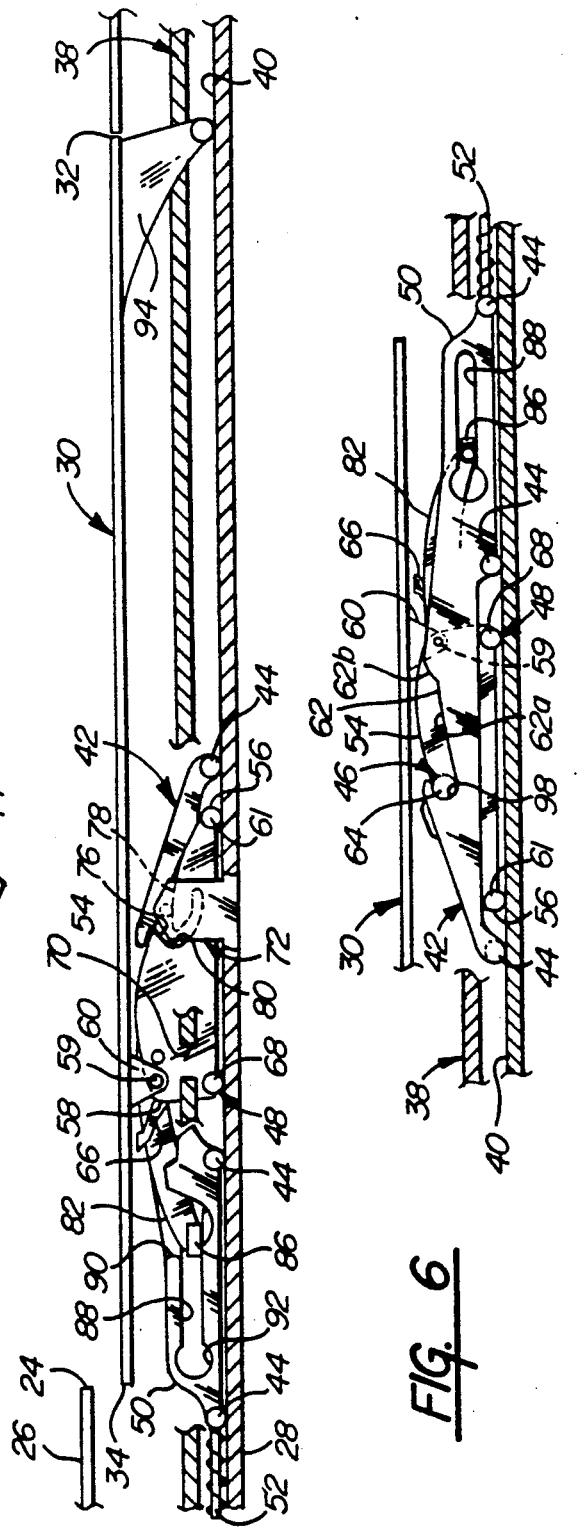

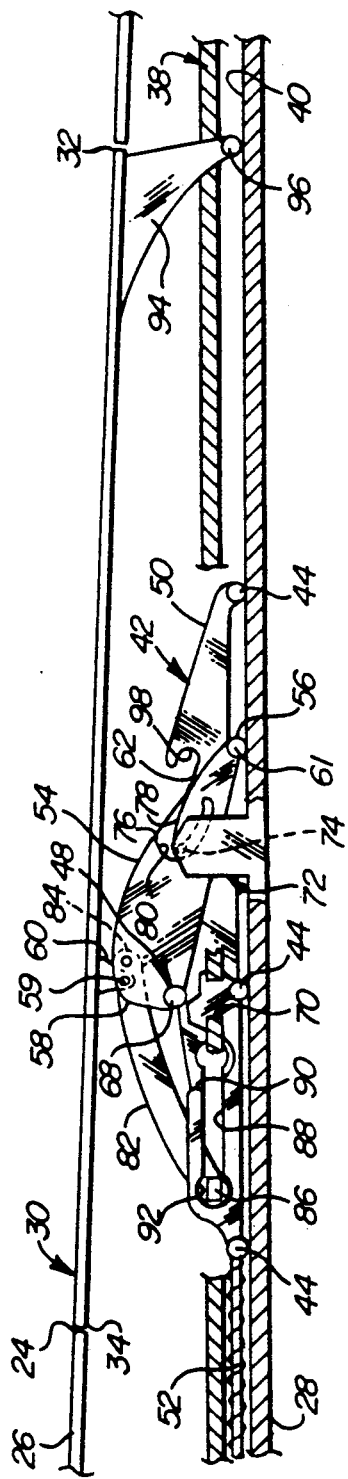

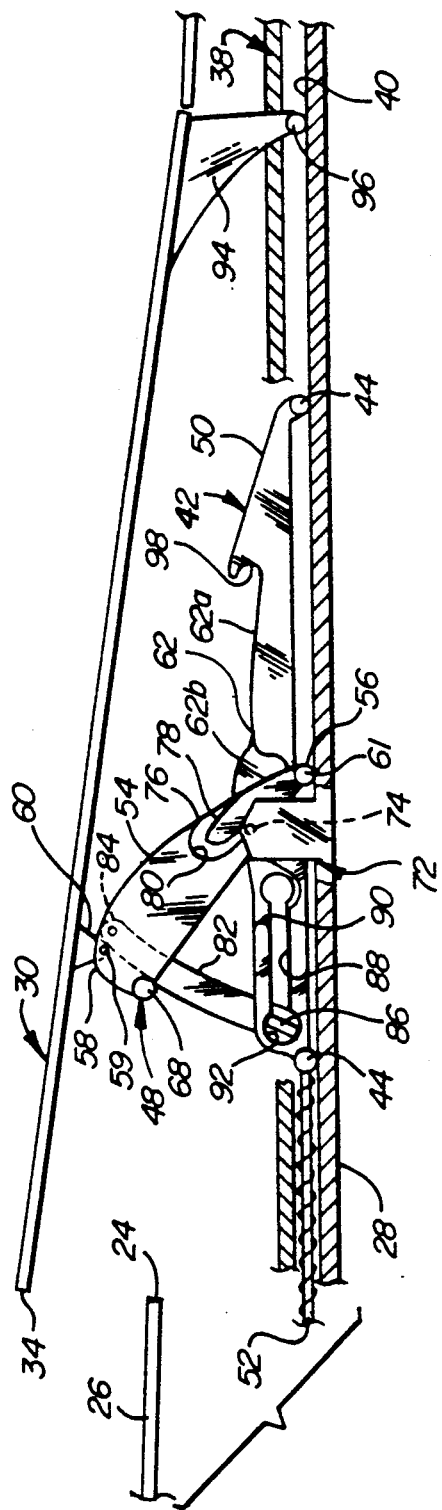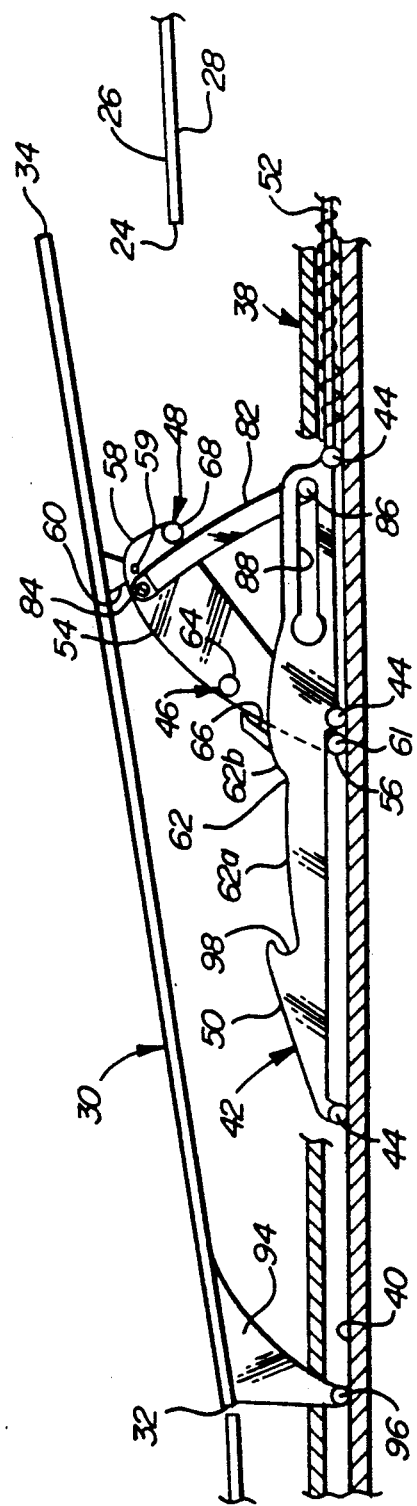

SLIDING AND TILTING SUNROOF CONTROL MECHANISM

TECHNICAL FIELD

The subject invention relates to a control assembly for moving a panel, such as a sunroof, between venting, closed, and collapsed positions and for moving the panel to a recessed storage receptacle when in the collapsed position.

BACKGROUND ART

Adjustable sunroof control assemblies are well known in the prior art for controlling the movements of a vehicular sunroof between a venting position wherein the rearward edge of the sunroof is tilted upwardly, a closed position wherein the sunroof is peripherally sealed about the roof opening, and a collapsed position wherein the rearward edge of the sunroof is tilted below the roof opening for allowing movement of the sunroof to a recessed storage position. Examples of such control assemblies are shown in the U.S. Pat. Nos. 4,566,730 to Knabe et al, issued Jan. 28, 1986, 4,601,512 to Boots, issued July 22, 1986, 4,609,222 to Boots, issued Sept. 2, 1986 and 4,643,478 to Boots, issued Feb. 17, 1987.

Such sunroof control assemblies have the inherent disadvantage of reducing the head room in the passenger compartment of the vehicle due the relatively large profile of the control assembly mechanism. In order to gain head room in the passenger compartment, the profile height of the sunroof control assembly must be reduced without diminishing the lift for the sunroof panel when in the venting position. Also, sunroof control assemblies have heretofore been extremely complex mechanisms requiring a multitude of moving parts and separate elements coacting to produce the desired motions, which mechanisms have been costly to produce and install as well as having relatively large profiles.

SUMMARY OF INVENTION AND ADVANTAGES

An adjustable sunroof control assembly comprises a guide means for establishing a predetermined guide path for a moveable sunroof panel. A drive means is operatively coupled to the guide means for interconnecting the sunroof panel and the guide means while maintaining a lateral spacing therebetween. An adjustor means is associated with the drive means for adjusting the lateral spacing between the sunroof panel and the guide means from an extended to a collapsed condition. The invention is characterized by the adjustor means including an integral lock means operatively engagable and disengagable with the guide means for locking the adjustor means in the collapsed condition while operatively engaged with the guide means and for assisting to adjust the spacing between the sunroof and the guide means while disengaged from the guide means.

The subject invention overcomes the deficiencies in the prior art by providing the lock means which is integral with the adjustor means and performs the dual alternative function of locking the adjustor means in the collapsed condition and adjusting the lateral spacing between the sunroof and the guide means. Therefore, the subject invention is a new combination including a single element, i.e., the lock means, providing two functions which have heretofore been accomplished by separate and independent elements, thereby reducing the number parts in the control assembly. This reduction of parts also cooperates in the reduction of the control assembly profile height and therefore allows for increased head room in the passenger compartment of the vehicle.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a partial, perspective view of a vehicle roof having an electronic sliding and tilting sunroof control assembly according to the subject invention;

FIG. 2 is a perspective view of the subject control assembly shown in the collapsed position;

FIG. 3 is a perspective view of the subject control assembly shown in the closed position;

FIG. 4 is a perspective view of the subject control assembly shown in the venting position;

FIG. 5 is a cross-sectional right side view of the control assembly attached to a sunroof and disposed in the collapsed position;

FIG. 6 is a left side view of the control assembly shown in FIG. 5;

FIG. 7 is a right side view of the control assembly attached to a sunroof and disposed in the closed position;

FIG. 8 is a left side view of the control assembly shown in FIG. 7;

FIG. 9 is a right side view of the control assembly attached to a sunroof and disposed in the venting position; and FIG. 10 is a left side view of the control assembly shown in FIG. 9.

DETAILED DESCRIPTION OF THE PREFERRED EMBODIMENT

Referring to the Figures, wherein like numerals indicate like or corresponding parts throughout the several views, a vehicle is generally indicated at 20 having a roof portion 22 supported over a passenger compartment. The roof 22 includes a generally rectangular opening 24 passing through to the passenger compartment. The roof 22 is of a double wall construction, as shown in FIGS. 5 and 7-10, having an upper wall 26 and a lower wall 28. The lower wall 28 forms the ceiling in the passenger compartment. The upper 26 and lower 28 walls are spaced apart forming a recess therebetween rearwardly of the opening 24.

A sunroof panel is generally indicated at 30 and includes a forward edge 32, a rearward edge 34 and two side edges 36. The sunroof panel 30 is moveable relative to the roof opening 24 to provide an adjustable airflow through the opening 24. The sunroof panel 30 is shown in FIG. 1 in a retracted position disposed within the roof recess between the upper 26 and lower 28 walls.

A guide means, generally indicated at 38 in FIGS. 2-10, is fixed within the recess and the roof 22, adjacent the lower wall 28. The guide means 38 establishes a predetermined guide path for moving the sunroof panel 30 toward and away from the opening 24, within the recess between the upper 26 and lower 28 walls. The guide means 38 includes a channel 40 disposed parallel to one side edge 36 of the sunroof panel 30 and along one side of the opening 24. In the preferred embodiment, an identical second channel 40 (not shown) is disposed adjacent the other side edge 36 of the sunroof panel 30 and other side of the opening 24. The guide means 28 guides the sunroof panel 30 in a generally planar path between the upper 26 and lower 28 walls of the roof 22.

A drive means, generally indicated a 42, is operatively coupled to the guide means 38 for movement therealong. The drive means 42 includes three rollers 44, i.e., forward, rearward and intermediate rollers 44, which are disposed for rolling engagement within the channel 40 of the guide means 38. Although not shown, an identical second drive means 42 is associated with the second channel 40 in the preferred embodiment. The drive means 42 interconnects the sunroof panel 30 and the guide means 38 while maintaining a lateral spacing therebetween. That is, the drive means 42 maintains a separation, perpendicular to the guide path, between the channel 40 and the sunroof panel 30.

An adjustor means, generally indicated 46, is associated with the drive means 42 for adjusting the lateral spacing between the sunroof panel 30 and the guide means 38 from a maximum extended, or venting, spacing or position shown in FIG. 9 to a minimum collapsed spacing or position shown in FIG. 5. In the venting position, the rearward edge 34 of the sunroof panel 30 is tilted upwardly from the roof opening 24. In the collapsed position, the rearward edge 34 is tilted downwardly from the roof opening 24. As shown in FIG. 7, the adjustor means 46 also moves the sunroof panel 30 to a closed position, intermediate the collapsed and venting positions, wherein the forward 32, rearward 34, and side edges 36 are completely sealed about the inner periphery of the roof opening 24.

The adjustor means 46 includes an integral lock means, generally indicated at 48, which is operatively engagable and disengagable with the channel 40 of the guide means 38. The lock means 48 locks the adjustor means 46 in the collapsed condition while operatively engaged with the guide means 38, and then allows movement of the adjustor means 46 from the collapsed condition when disengaged from the guide means 38. Additionally, the lock means 48 cooperates, or assists, in adjusting the lateral spacing between the sunroof panel 30 and the guide means 38 while it is disengaged from the guide means 38. Therefore, the lock means 48 of the subject invention is integral with and part of the adjustor means 46 and therefore performs two functions which have heretofore required two separate elements. Therefore, the lock means 48 of the subject invention consolidates two prior art functions into one element to reduce the number of moving parts in the subject control assembly.

The drive means 42 includes a carriage 50 comprising a rigid, unitary structure supporting several of the rollers 44. The carriage 50 is confined to movement within the channel 40. A motion transmitting element 52 is attached to the carriage 50 and actuated by a remote actuator, such as an electric motor (not shown). The motion transmitting element 52 is disposed within the channel 40 and urges the carriage 50 to move forwardly and rearwardly therein.

The drive means 42 also includes an actuator arm 54 which extends between a first end 56 adjacent the guide means 38 and a second end 58 which is spaced laterally from the guide means 38. More specifically, the second end 58 is pivotally connected to the sunroof panel 30 at a pivotal connection 59 adjacent a side edge 36. A flange 60 extends downwardly from the sunroof panel 30 adjacent the rearward edge 34, for supporting the pivotal connection 59.

A roller 61 is disposed on the first end 56 of the actuator arm 54 directly connects the sunroof panel 30 to the channel 40. The roller 61 is confined in a cavity underneath the carriage 50 for movement in the channel 40 between the forward and rearward rollers 44. The actuator arm 54 also operatively interconnects the carriage 50 and the sunroof panel 30 for movement along the guide path, so that as the motion transmitting element 52 moves the carriage 50, the sunroof panel 30 is caused to move therewith. When the actuator arm 54 is in the collapsed position, the roller 61 is disposed adjacent the forward most roller 44 of the carriage 50. As the actuator arm 54 moves toward the venting position, the roller 61 slides rearwardly relative to the carriage 50, toward the intermediate roller 44.

The carriage 50 includes a lift cam surface 62 which cooperates with a lift cam follower 64 on the actuator arm 54 for moving the second end 58 of the actuator arm 54 laterally away from the guide means 38. As the carriage 50 is moved forwardly relative to the actuator arm 54, the lift cam follower 64 slides over and is cammed upwardly by the inclined lift cam surface 62 on the carriage 50, thus displacing the pivotal connection 59 upwardly and causing the rearward edge 34 of the sunroof panel 30 to move away from the channel 40. At the same time, the roller 61 at the first end 56 of the actuator arm 54 slides rearwardly in the cavity beneath the carriage 50 toward the intermediate roller 44. As perhaps best shown in FIGS. 6, 8 and 10, the lift cam surface 62 is composed of a first slope 62a and a second slope 62b which is greater than the first slope 62a. The first slope 62a moves the actuator arm 54 from the collapsed position to the closed position, whereas the second slope 62b moves the actuator arm 54 from the closed position to the venting position.

Similarly, the carriage 50 includes a collapse cam surface 66 which cooperates with a collapse cam follower 68 of the actuator arm 54 for urging the second end 58 of the actuator arm 54 toward the guide means 38. Therefore, as the carriage 50 slides relative to the actuator arm 54, the collapse cam follower 68 slides against and is cammed downwardly by the inclined surface of the collapse cam surface 66. Such movement of the actuator arm 54 causes its roller 61 at the first end 56 to move forwardly relative to the carriage 50 toward the forward roller 44 thereof.

The collapse cam follower 68 forms part of the lock means 48 in that it becomes trapped within the channel 40 after passing through an opening 70 in the channel 40 as the adjustor means 46 is moved to the collapsed position. This confines both the roller 61 at the first end 56 of the actuator arm 54 and the collapse cam follower 68 in the channel 40 and thereby prevents any movement of the actuator arm 54 except linear movement along the channel 40. Therefore, the collapse cam follower 68 forms a member which is moveable into and out of operative engagement with the guide means 38 for locking the adjustor means 46 in the collapsed position.

A stop means, generally indicated at 72, is provided for preventing movement of the sunroof panel 30 past a predetermined stop position along the guide means 38. The stop means 72 includes a stop pin 74 extending from the guide means 38 inwardly toward the drive means 42. The stop pin 74 engages a stop cam 76 disposed in the actuator arm 54.

In FIGS. 2 and 5, the stop pin 74 is shown at the point of engagement with the stop cam 76. At this point, the adjustor means 46 is in the collapsed position and the carriage 50 and actuator arm 54 are free to move rearwardly as a sliding unit, away from the stop pin 74. However, upon forward movement of the carriage 50, the stop cam 76 moves in a curvilinear path causing the stop pin 74 to pass through a straight entrance portion 78 of the stop cam 76. When the stop pin 74 reaches the end of the entrance portion 78 it abuts a curved portion 80 of the stop cam 76 which prevents further forward movement of the sunroof 30 via the attachment to the actuator arm 54 at the pivotal connection 59.

As the motion transmitting element 52 continues to urge the carriage 50 forwardly, the lift cam surface 62 and lift cam follower 64 coact to urge the actuator arm 54 upwardly with the collapse cam follower 68 passing through the opening 70 in the channel 40, as shown in FIGS. 3 and 7. The adjustor means 46 moves toward the fully extended, or venting, position shown in FIG. 9 as the motion transmitting element 52 continues to exert a force on the carriage 50 in the forward direction.

The adjustor means 46 further includes a brace member 82 having a pivot end 84 pivotally connected to the actuator arm 54 and a slide end 86 slideably connected to the carriage 50 for bracing the actuator arm 54 in the vent position and for assisting to collapse the adjustor means 46 from the vent position. The carriage 50 includes a slot 88 having an entrance 90 at one end and a culdesac 92 at the other end. The slot 88 forms a keyway between the entrance 90 and the culdesac 92. The slide end 86 of the brace member 82 has a generally rectangular shape adapted to slide linearly in the keyway of the slot 88, but prevented from rotating within the keyway due to its elongated width. Once reaching the culdesac 92, as shown in FIGS. 3, 4 and 7-10, the slide end 86 of the brace member 82 is free to rotate within the culdesac 92 as the actuator arm 54 moves between the venting and closed positions.

Referring to FIGS. 4, 9 and 10, when the motion transmitting element 52 urges the carriage 50 to collapse the adjustor means 46 from the vent position, the slide end 86 of the brace member 82 pulls against the inner peripheral edges of the culdesac 92 thereby pulling downwardly therewith the second end 58 of the actuator arm 54. This, therefore, urges the rearward edge 34 of the sunroof panel 30 downwardly to the closed position. The rectangular shape of the slide end 86 of the brace member 82 locks the adjustor means 46 in the vent position because the slide end 86 is trapped within the culdesac 92 in the vent position.

As best shown in FIGS. 5 and 7-10, the sunroof panel 30 includes a leg 94 extending downwardly from its forward edge 32 and including a roller element 96 disposed for rolling or sliding movement in the channel 40. Therefore, the sunroof panel 30 is connected to the control assembly via the pivotal connection 59 and the roller element 96. The spacing between the upper wall 26 and lower wall 28 adjacent the forward edge 32 is smaller than the spacing between the upper wall 26 and lower wall 28 adjacent the rearward edge 34 of the sunroof panel 30 so that as the sunroof panel 30 is moved rearwardly into the recess in the roof 22, adequate clearance is provided for the forward edge 32 of the sunroof panel 30 to pass between the upper 26 and lower 28 walls.

The carriage 50 includes a catch 98 for engaging the lift cam follower 64 when the assembly is in the collapsed position. That is, the catch 98 secures the actuator arm 54 and the sunroof panel 30 to the carriage 50 as a sliding unit while the carriage 50 is pulled rearwardly by the motion transmitting element 52.

In order to further reduce the profile height of the drive means 42, i.e., the height between the sunroof panel 30 and the channel 40 as shown in FIGS. 5-10, the collapse cam surface 66 of the carriage 50 is disposed between the lift cam surface 62 and the guide means 38. For this reason, separate followers 64, 68 are required to coact with the respective lift 62 and collapse 66 cam surfaces.

The operation of the subject sunroof control assembly will be described presently with reference to FIGS. 5-10. The sunroof panel 30 is moved from a rearwardly recessed location between the upper 26 and lower 28 walls of the roof 22 forwardly toward the opening 24, as shown in FIG. 5. The forward edge 32 of the sunroof 30 engages the forward edge of the opening 24 at approximately the same instant the stop pin 74 enters the stop cam 76.

As the motion transmitting element 52 continues to urge the carriage 50 in a forward direction, the stop pin 74 travels to the end of the entrance portion 78 of the stop cam 76 and engages the curved portion 80. This prevents further forward movement of the actuator arm 54 and causes the lift cam follower 64 to travel along and cam upwardly against the first slope 62a of the lift cam surface 62. With this, the pivotal connection 59 of the actuator arm 54 is urged upwardly, away from the guide means 38, causing the rearward edge 34 of the sunroof panel 32 to move into and seal about the roof opening 24 as shown in FIG. 7.

The sunroof panel 30 is moved from the closed position of FIG. 7 to the vent position of FIG. 9 by continuing to urge the carriage 50 forwardly via the motion transmitting element 52. This causes the lift cam follower 64 to continue its upward camming engagement along the second slope 62b of the lift cam surface 62. At the same time, the slide end 86 of the brace member 82 engages the internal edges of the culdesac 92 to assist in the upward camming of the sunroof panel 30 toward the vent position shown in FIG. 9.

The sunroof panel 30 is moved from the vent position back to the closed position by urging the carriage 50 rearwardly via the motion transmitting element 52. This causes the slide end 86 of the brace member 82 to be pulled rearwardly by the internal edges of the culdesac 92, until the collapse cam follower 68 can engage and begin camming downwardly against the collapse cam surface 66. During this movement, the actuator arm 54 is prevented from moving in either direction by the stop pin 74 disposed in the stop cam 76.

As the actuator arm 54 moves from the closed position to the collapsed position, the collapse cam follower 68 is cammed downwardly through the opening 70 in the channel 40 and the stop pin 74 becomes located in the straight entrance portion 78 of the stop cam 76. At this point, the actuator arm 54 is freed from the stop means 72 and allowed to travel rearwardly in the channel 40 with the carriage 50 as a sliding unit, with the collapse cam follower 68 becoming confined to travel within in the channel 40.

The invention has been described in an illustrative manner, and it is to be understood that the terminology which has bee used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. An adjustable sunroof control assembly for operating a sunroof panel in a sunroof opening between closed, ventilating, and collapsed positions comprising:

guide channel means for establishing a predetermined longitudinal guide path of fore and aft movement of the moveable sunroof panel, a carriage operatively coupled to said guide channel means for fore and aft movement along the guide means, an actuator arm having an upper end pivotally mounted on the sunroof panel and a lower end captured by the carriage for limited movement of the lower end relative the carriage, said carriage and said actuator arm having a normal position in which the sunroof panel is established in a position closing the roof opening;

lift cam means acting between the carriage and the actuator arm and cooperating to lift the actuator arm when the carriage is driven forward from the normal position to thereby lift the sunroof panel toward the ventilating position;

and a brace member having an upper end pivotally mounted on the actuator arm and a lower end moving within an aperture in the carriage for limited movement of the lower end relative to the carriage, said forward movement of the carriage which induces the lift cam means to lift the actuator causing the brace member to be drivingly engaged by the carriage so that the carriage drives the brace member causing the brace member to lift the actuator arm beyond the lifting of the actuator arm by the lift cam means.

2. The combination of claim 1 in which the aperture is a longitudinal extending slot with a cul-de-sac at an end thereof and the brace member carries a rectangular shaped end riding in the slot and unable to rotate in the slot until the forward movement of the carriage carries the cul-de-sac to the rectangular shaped end so that the brace member is permitted to rotate to a rotated position during further forward movement of the carriage and yet the rectangular shaped end is also prevented from re-entering the slot until the brace member has returned from the rotated position so that the brace member forcibly pulls the actuator arm downwardly when the carriage member is again driven rearwardly.

* * * * *